US011728707B2

(12) United States Patent
Ishikawa et al.

(10) Patent No.: US 11,728,707 B2
(45) Date of Patent: Aug. 15, 2023

(54) DRIVING DEVICE

(71) Applicant: NIDEC CORPORATION, Kyoto (JP)

(72) Inventors: Yuki Ishikawa, Kyoto (JP); Hayato Nakama, Kyoto (JP); Keisuke Fukunaga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 492 days.

(21) Appl. No.: 17/040,541

(22) PCT Filed: Mar. 22, 2019

(86) PCT No.: PCT/JP2019/012253
§ 371 (c)(1),
(2) Date: Sep. 23, 2020

(87) PCT Pub. No.: WO2019/188844
PCT Pub. Date: Oct. 3, 2019

(65) Prior Publication Data
US 2021/0044173 A1   Feb. 11, 2021

(30) Foreign Application Priority Data

Mar. 24, 2018 (JP) ................................ 2018-057322

(51) Int. Cl.
*H02K 5/22* (2006.01)
*H02K 9/19* (2006.01)
(Continued)

(52) U.S. Cl.
CPC ............. *H02K 5/22* (2013.01); *B60B 35/122* (2013.01); *B60K 17/16* (2013.01); *B60K 17/24* (2013.01); *H02K 9/19* (2013.01)

(58) Field of Classification Search
CPC . H02K 5/22; H02K 5/00; H02K 7/116; H02K 9/19
(Continued)

(56) References Cited

U.S. PATENT DOCUMENTS

2017/0057349 A1   3/2017 Ogawa et al.

FOREIGN PATENT DOCUMENTS

| JP | 200060059 A | | 2/2000 |
|---|---|---|---|
| JP | 2000060059 A | * | 2/2000 |

(Continued)

OTHER PUBLICATIONS

International Search Report in PCT/JP2019/012253, dated Jun. 11, 2019. 2pp.

*Primary Examiner* — Jose A Gonzalez Quinones
(74) *Attorney, Agent, or Firm* — Hauptman Ham, LLP (57) ABSTRACT

According to one aspect of the present disclosure, a driving device is a driving device for rotating an axle of a vehicle and includes: a motor having a rotor rotating about a motor axis extending in a horizontal direction orthogonal to a vertical direction; a reduction gear connected to the rotor; a differential gear connected to the motor via the reduction gear; and a housing configured to house the motor, the reduction gear and the differential gear therein. The housing has a protrusion that protrudes upward in the vertical direction, and at least one circumferential rib that extends in a circumferential direction. The protrusion has a female screw hole into which an eye bolt can be tightened. At least one of the circumferential ribs is connected to the protrusion.

8 Claims, 6 Drawing Sheets

(51) Int. Cl.
  *H02K 5/00* (2006.01)
  *H02K 7/116* (2006.01)
  *B60B 35/12* (2006.01)
  *B60K 17/16* (2006.01)
  *B60K 17/24* (2006.01)

(58) Field of Classification Search
  USPC .................. 310/89, 98, 75 R, 400, 402, 418
  See application file for complete search history.

(56) References Cited

FOREIGN PATENT DOCUMENTS

| JP | 2016144307 | A | * | 8/2016 | ............... H02K 5/00 |
| JP | 2016144307 | A |   | 8/2016 | |
| JP | 201744237 | A |   | 3/2017 | |
| JP | 201827003 | A |   | 2/2018 | |
| JP | 2018027003 | A | * | 2/2018 | ........... H01Q 1/1271 |
| WO | WO-2018030218 | A1 | * | 2/2018 | ........... H01Q 1/1271 |

* cited by examiner

DRIVING DEVICE

CROSS-REFERENCE TO RELATED APPLICATIONS

This is the U.S. national stage of application No. PCT/JP2019/012253, filed on Mar. 22, 2019, and priority under 35 U.S.C. § 119(a) and 35 U.S.C. § 365(b) is claimed from Japanese Application No. 2018-057322, filed on Mar. 24, 2018.

FIELD OF THE INVENTION

The present disclosure relates to a driving device.

BACKGROUND

A driving device that includes a motor and rotates an axle of a vehicle is known.

SUMMARY

According to one aspect of the present disclosure, a driving device is a driving device for rotating an axle of a vehicle and includes: a motor having a rotor that rotates about a motor axis that extends in a horizontal direction orthogonal to a vertical direction; a reduction gear connected to the rotor; a differential gear connected to the motor via the reduction gear; and a housing configured to house the motor, the reduction gear, and the differential gear. The housing includes a protrusion that protrudes upward in the vertical direction, and at least one circumferential rib that extends in a circumferential direction. The protrusion has a female screw hole into which an eye bolt can be tightened. At least one of the circumferential ribs is connected to the protrusion.

The above and other elements, features, steps, characteristics and advantages of the present disclosure will become more apparent from the following detailed description of the preferred embodiments with reference to the attached drawings.

DETAILED DESCRIPTION

Hereinafter, a driving device according to an embodiment of the present disclosure will be described with reference to the drawings. The scope of the present disclosure is not limited to the following embodiments and can be arbitrarily changed within the scope of the technical idea of the present disclosure.

In the following description, a vertical direction will be defined and described based on the positional relationship when the driving device of the embodiment illustrated in each drawing is mounted on a vehicle located on a horizontal road surface. In addition, in the drawings, an XYZ coordinate system is appropriately illustrated as a three-dimensional orthogonal coordinate system. In the XYZ coordinate system, a Z-axis direction is the vertical direction. A +Z side is an upper side in the vertical direction, and a −Z side is a lower side in the vertical direction. In the following description, the upper side in the vertical direction will be simply referred to as an "upper side", and the lower side in the vertical direction will be simply referred to as a "lower side". An X-axis direction is a direction orthogonal to the Z-axis direction and a back-forth direction of the vehicle on which the driving device is mounted. In the following embodiments, a +X side is a front side of the vehicle, and a −X side is a rear side of the vehicle. A Y-axis direction is a direction orthogonal to both the X-axis direction and the Z-axis direction, and is a right-left direction of the vehicle, that is, a vehicle width direction. In the following embodiments, a +Y side is a left side of the vehicle, and a −Y side is a right side of the vehicle. The back-forth direction and the right-left direction are horizontal directions orthogonal to the vertical direction.

Note that the positional relationship in the back-forth direction is not limited to the positional relationship of the following embodiments, and the +X side may be the rear side of the vehicle, and the −X side may be the front side of the vehicle. In this case, the +Y side is the right side of the vehicle, and the −Y side is the left side of the vehicle.

A motor axis J2, which is illustrated in each drawing as appropriate, extends in the Y-axis direction, that is, in the right-left direction of the vehicle. In the following description, unless otherwise specified, a direction parallel to the motor axis J2 is simply referred to as an "axial direction", a radial direction about the motor axis J2 is simply referred to as a "radial direction", and a circumferential direction about the motor axis J2, that is, the circumference of the motor axis J2 is simply referred to as a "circumferential direction". In the present specification, the "parallel direction" also includes a substantially parallel direction, and the "orthogonal direction" also includes a substantially orthogonal direction.

Note that in the present embodiment, the left side corresponds to one side in the axial direction, and the right side corresponds to another side in the axial direction. Further, in the present embodiment, the back-forth direction corresponds to a predetermined direction orthogonal to both the vertical direction and the axial direction. In the present embodiment, the rear side corresponds to one side in the predetermined direction.

Hereinafter, a motor unit (electric driving device) 1 will be described as a driving device according to an exemplary embodiment of the present disclosure with reference to the drawings.

Figure 1:
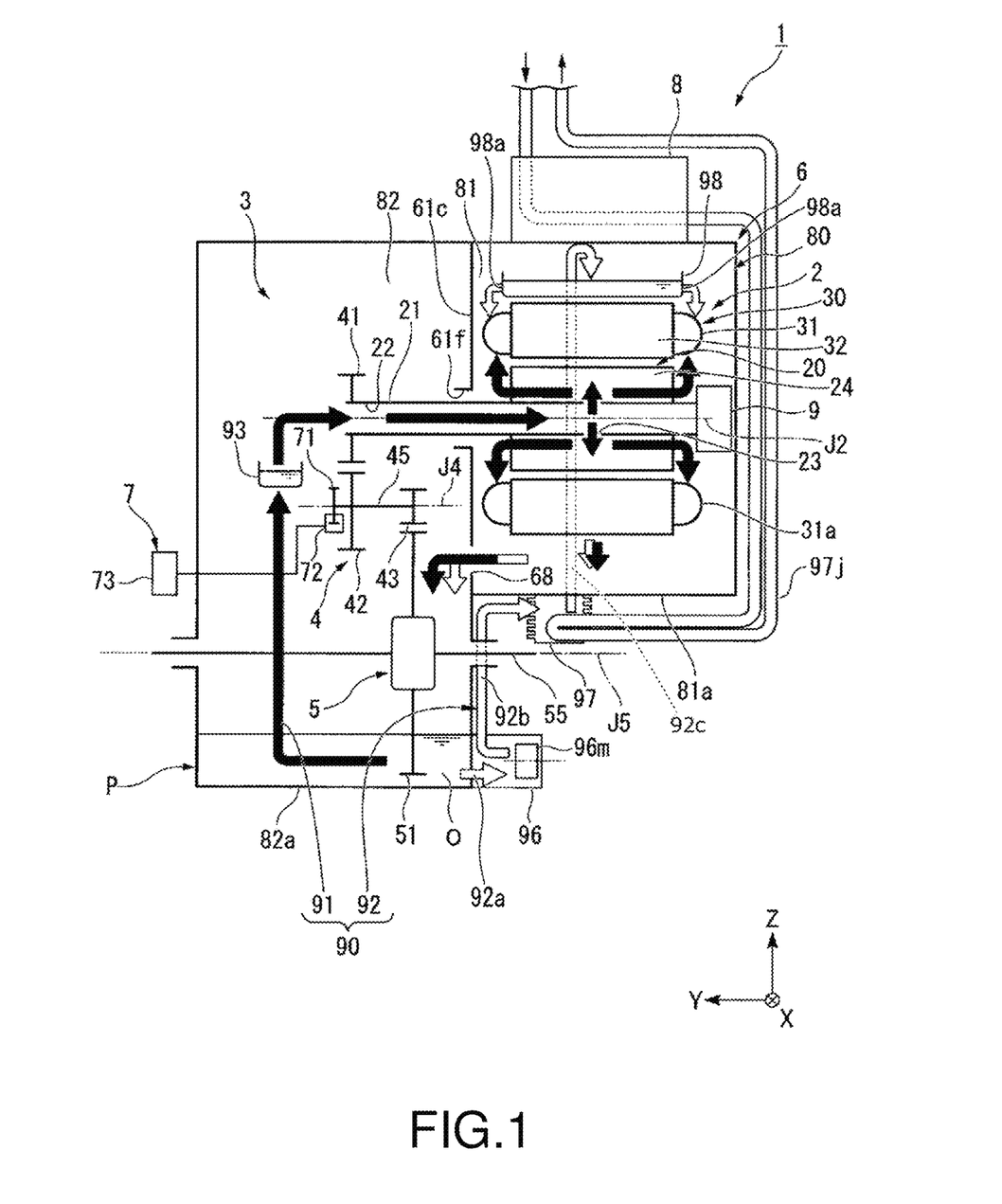
FIG. 1 is a conceptual diagram of a motor unit according to an embodiment.
Figure 2:
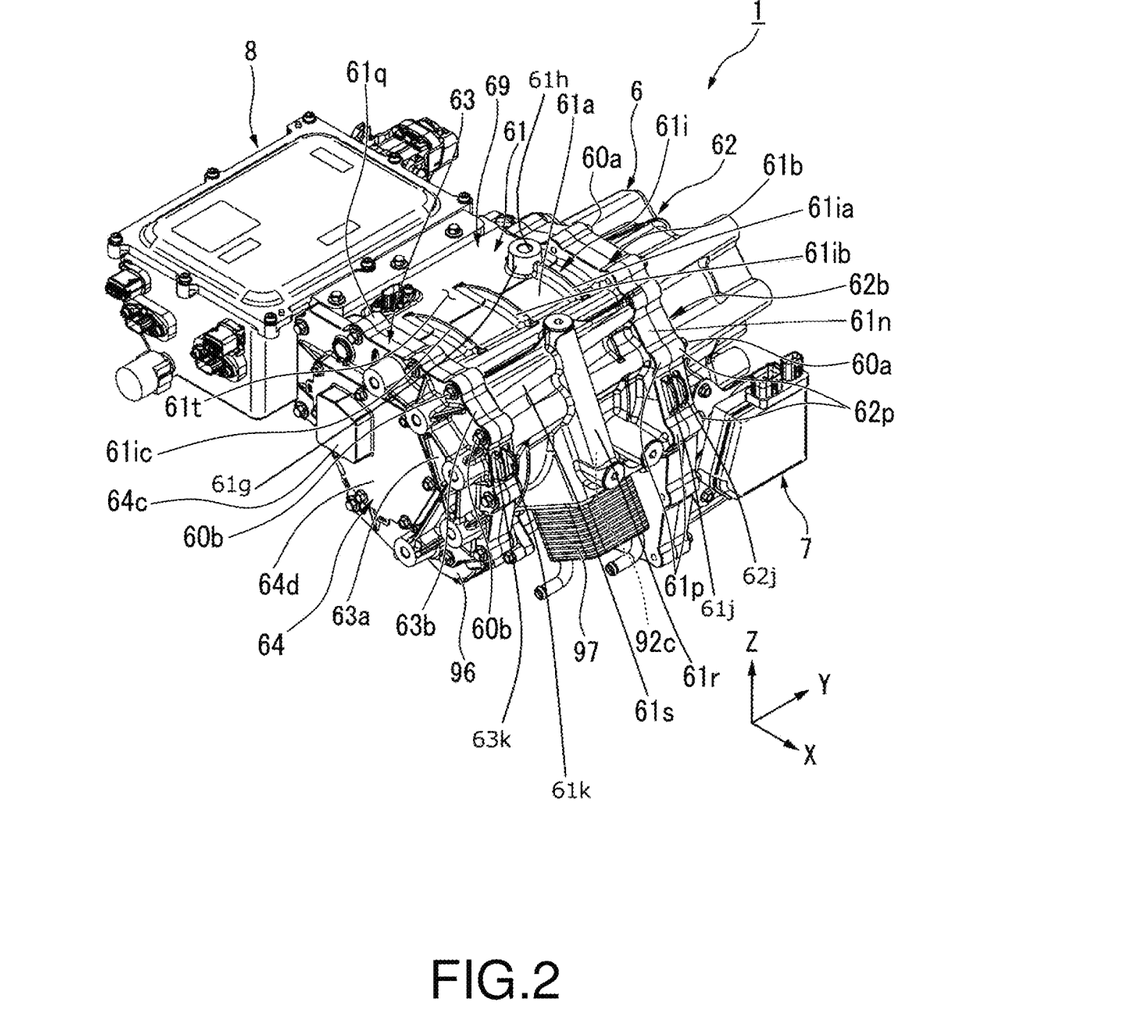
FIG. 2 is a perspective view of the motor unit according to the embodiment.
Figure 3:
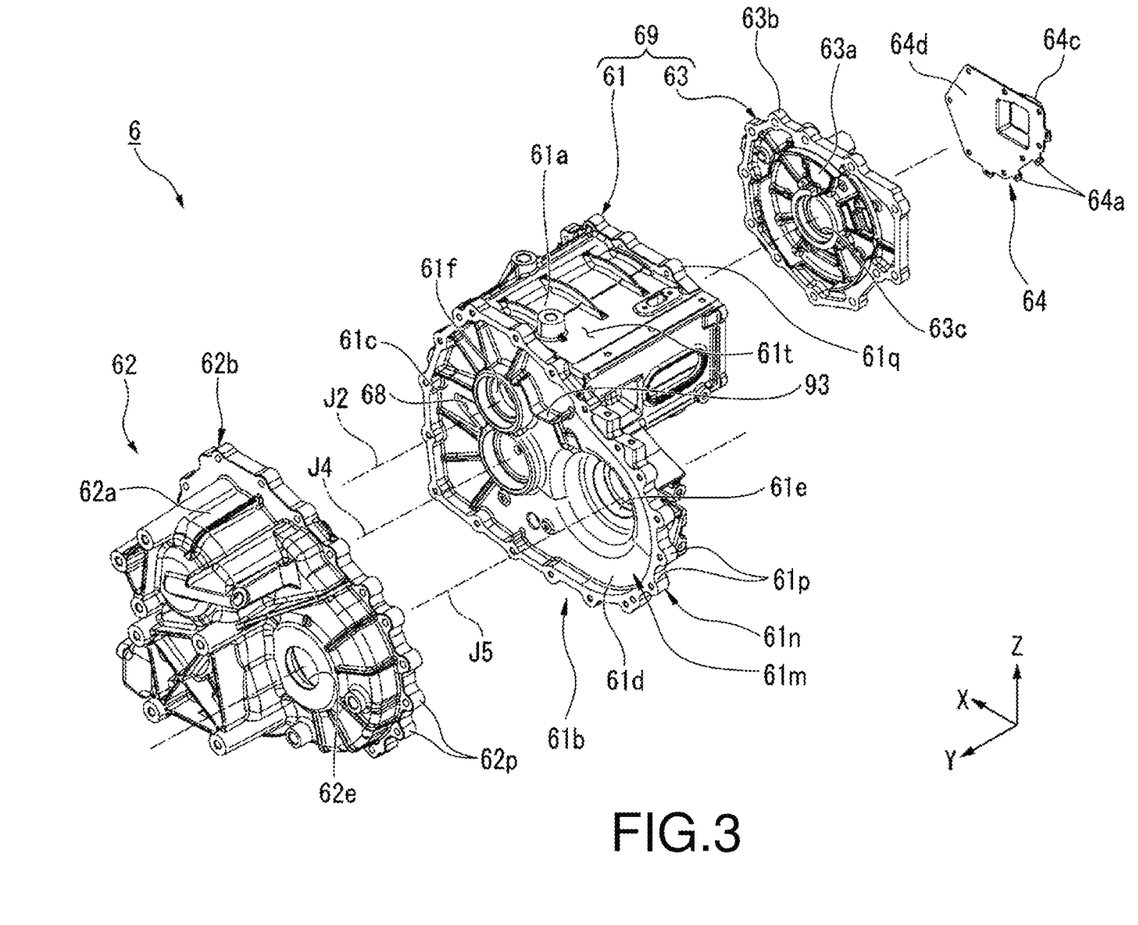
FIG. 3 is an exploded view of a housing of the embodiment.
Figure 4:
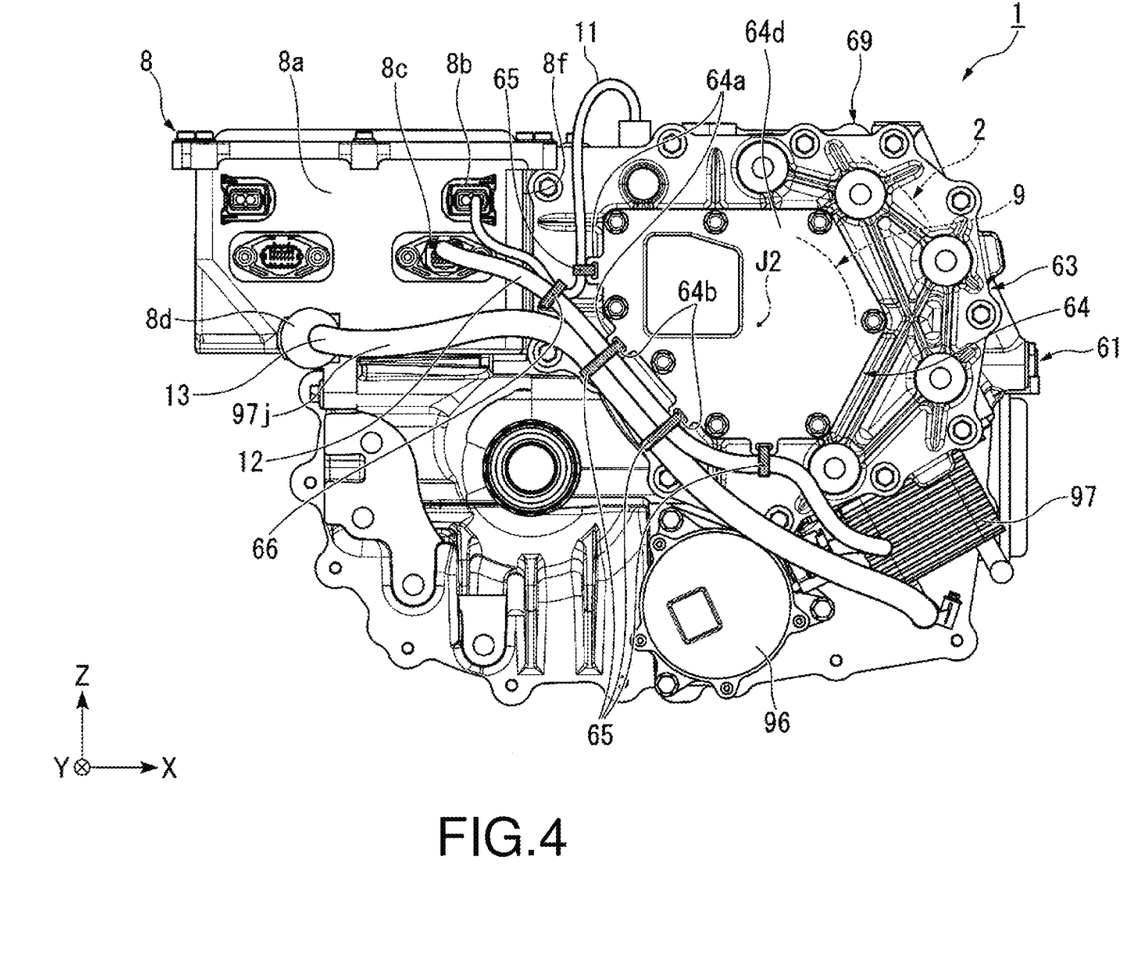
FIG. 4 is a side view of the motor unit according to the embodiment.

FIG. 1 is a conceptual diagram of the motor unit 1 according to the embodiment. FIG. 2 is a perspective view of the motor unit 1. FIG. 3 is an exploded view of a housing 6 of the motor unit 1. FIG. 4 is a side view of the motor unit 1. Note that FIG. 1 is merely the conceptual diagram, and the arrangement and dimensions of each unit are not necessarily the same as those in reality.

The motor unit 1 is mounted on a vehicle having a motor as a power source, such as a hybrid vehicle (HEV), a plug-in hybrid vehicle (PHV), an electric vehicle (EV), and the like, and is used as a power source thereof.

As illustrated in FIG. 1, the motor unit 1 includes a motor (main motor) 2, a gear unit 3, a housing 6, oil O contained inside the housing 6, an inverter unit (control unit) 8, and a parking mechanism 7. A housing space 80 for housing the motor 2 and the gear unit 3 is provided inside the housing 6. The housing 6 has a partition wall portion 61c. The housing space 80 is partitioned into a motor chamber 81 for housing the motor 2 and a gear chamber 82 for housing the gear unit 3 by the partition wall portion 61c.

In the present embodiment, the motor 2 is an inner rotor motor. The motor 2 includes a rotor 20, a stator 30, and a rotation angle sensor 9. The rotor 20 rotates about a motor axis J2 extending in the horizontal direction. The rotor 20 rotates when electric power is supplied from a battery (not illustrated) to the stator 30. The torque of the rotor 20 is transmitted to the gear unit 3. The rotor 20 has a shaft (motor shaft) 21, a rotor core 24, and rotor magnets (not illustrated).

The shaft 21 extends about the motor axis J2. The shaft 21 rotates about the motor axis J2. The shaft 21 is a hollow shaft in which a hollow portion 22 having an inner peripheral surface extending along the motor axis J2 is provided inside. The shaft 21 is provided with a communication hole 23. The communication hole 23 extends in the radial direction, and connects the hollow portion 22 and the outside of the shaft 21. The shaft 21 extends across the motor chamber 81 and the gear chamber 82 in the housing 6. An end portion on the left side (+Y side) of the shaft 21 protrudes into the gear chamber 82. A first gear 41 is fixed to the end portion of the shaft 21 that protrudes into the gear chamber 82.

The rotor core 24 is, for example, formed by laminating silicon steel sheets. The rotor core 24 is a columnar body extending along the axial direction. The plurality of rotor magnets (not illustrated) are fixed to the rotor core 24. The plurality of rotor magnets are arranged along the circumferential direction with their magnetic poles alternating.

The stator 30 is located on an outer side of the rotor 20 in the radial direction, and surrounds the rotor 20 from the outer side in the radial direction. The stator 30 has a stator core 32, a coil 31, and an insulator (not illustrated) interposed between the stator core 32 and the coil 31. The stator 30 is held in the housing 6. The stator core 32 has a plurality of magnetic pole teeth (not illustrated) in a radially inward direction from an inner peripheral surface of an annular yoke. A coil wire is wound between the magnetic pole teeth. The coil wire wound around the magnetic pole tooth constitutes the coil 31. The coil wire is connected to the inverter unit 8 via a bus bar (not illustrated). The coil 31 has a coil end 31a that protrudes from an axial end face of the stator core 32. The coil end 31a protrudes in the axial direction from an end portion of the rotor core 24 of the rotor 20. The coil end 31a protrudes to both sides in the axial direction with respect to the rotor core 24.

The rotation angle sensor 9 detects a rotation angle of the rotor 20. In the present embodiment, the rotation angle sensor 9 is, for example, a variable reluctance (VR) resolver. The rotation angle sensor 9 has a resolver rotor (not illustrated) fixed to the shaft 21 and a resolver stator (not illustrated) fixed to the housing 6. The resolver stator surrounds the resolver rotor from the outside in the radial direction. The rotation angle sensor 9 is connected to the inverter unit 8 via a signal line 11 (see FIG. 4). The rotation angle sensor 9 transmits information on the rotation angle of the rotor 20 to the inverter unit 8 via the signal line 11.

The gear unit 3 is connected to the shaft 21 on the left side (+Y side) of the motor axis J2. The gear unit 3 includes a reduction gear 4 and a differential gear 5. That is, the motor unit 1 includes the reduction gear 4 and the differential gear 5. The torque output from the motor 2 is transmitted to the differential gear 5 via the reduction gear 4.

The reduction gear 4 is connected to the rotor 20 of the motor 2. In the present embodiment, the reduction gear 4 is located on the left side (+Y side) of the motor 2 in the axial direction of the motor axis J2. The reduction gear 4 has a function of decreasing the rotation speed of the motor 2 and increasing the torque output from the motor 2 according to a speed reduction ratio. The reduction gear 4 transmits the torque output from the motor 2 to the differential gear 5.

The reduction gear 4 has the first gear (intermediate drive gear) 41, a second gear (intermediate gear) 42, a third gear (final drive gear) 43, and an intermediate shaft 45. The torque output from the motor 2 is transmitted to a ring gear 51 of the differential gear 5 via the shaft 21 of the motor 2, the first gear 41, the second gear 42, the intermediate shaft 45, and the third gear 43. The gear ratio of each gear, the number of gears, and the like can be variously changed according to the required speed reduction ratio. The reduction gear 4 is a parallel shaft gear reducer in which an axis of each gear is arranged in parallel.

The first gear 41 is provided on the outer peripheral surface of the shaft 21 of the motor 2. The first gear 41 rotates about the motor axis J2 together with the shaft 21. The intermediate shaft 45 extends along an intermediate axis J4 that is parallel to the motor axis J2. The intermediate shaft 45 rotates about the intermediate axis J4. The second gear 42 and the third gear 43 are provided on the outer peripheral surface of the intermediate shaft 45. The second gear 42 and the third gear 43 are connected via the intermediate shaft 45. The second gear 42 and the third gear 43 rotate about the intermediate axis J4. The second gear 42 meshes with the first gear 41. The third gear 43 meshes with the ring gear 51 of the differential gear 5. The third gear 43 is located on a partition wall portion 61c side (right side, −Y side) with respect to the second gear 42.

The differential gear 5 is connected to the motor 2 via the reduction gear 4. The differential gear 5 is a device for transmitting the torque output from the motor 2 to the wheels of the vehicle. The differential gear 5 has a function of transmitting the same torque to axles 55 of right and left wheels while absorbing a difference in speed between right and left wheels when the vehicle turns. Accordingly, the motor unit 1 rotates the axles 55 of the vehicle. The differential gear 5 includes the ring gear 51, a gear housing (not illustrated), a pair of pinion gears (not illustrated), a pinion shaft (not illustrated), and a pair of side gears (not illustrated).

The ring gear 51 rotates about a differential axis J5 parallel to the motor axis J2. The torque output from the motor 2 is transmitted to the ring gear 51 via the reduction gear 4. That is, the ring gear 51 is connected to the motor 2 via the other gears.

In an electric vehicle, since there is no brake mechanism for braking the vehicle other than a side brake, the motor unit 1 needs to be provided with the parking mechanism 7.

As illustrated in FIG. 1, the parking mechanism 7 includes: a parking gear 71 which is fixed to the intermediate shaft 45 and rotates about the intermediate axis J4 together with the intermediate shaft 45; a rotation blocking portion 72 which moves between the teeth of the parking gear 71 and blocks the rotation of the parking gear 71; and a parking motor 73 which drives the rotation blocking portion 72. When the motor 2 operates, the rotation blocking portion 72 retracts from the parking gear 71. On the other hand, when a shift lever is in the parking position, the parking motor 73 moves the rotation blocking portion 72 between the teeth of the parking gear 71, thereby blocking the rotation of the parking gear 71.

The housing 6 houses the motor 2, the reduction gear 4, and the differential gear 5 therein. The housing 6 holds the motor 2, the reduction gear 4, and the differential gear 5 in the housing space 80. An oil sump P for collecting the oil O is provided in a lower region inside the housing space 80. More specifically, the oil sump P is provided in a lower region inside the gear chamber 82. In the present embodiment, a bottom portion 81a of the motor chamber 81 is located above a bottom portion 82a of the gear chamber 82. A partition wall opening 68 is provided in the partition wall portion 61c that divides the motor chamber 81 from the gear chamber 82. The partition wall opening 68 communicates the motor chamber 81 and the gear chamber 82 to each other. The partition wall opening 68 moves the oil O collected in the lower region inside the motor chamber 81 to the gear chamber 82.

As illustrated in FIGS. 2 and 3, the housing 6 has a first housing member 61, a second housing member 62, a third housing member 63, and a lid member 64. The second housing member 62 is located on the left side (+Y side) of the first housing member 61. The third housing member 63 and the lid member 64 are located on the right side (−Y side) of the first housing member 61. In the present embodiment, the first housing member 61 and the third housing member 63 constitute a housing body 69 that houses the motor 2. That is, the housing 6 has the housing body 69. The motor chamber 81 is provided inside the housing body 69.

As illustrated in FIG. 3, the first housing member 61 has a peripheral wall portion 61a, a side plate portion 61b, and a fourth flange portion 61q. The peripheral wall portion 61a has a cylindrical shape surrounding the motor 2 from the outside in the radial direction. The space inside of the peripheral wall portion 61a constitutes the motor chamber 81. An upper surface of the outer peripheral surface of the peripheral wall portion 61a has a flat surface 61t that is orthogonal to the axial direction.

The side plate portion 61b is connected to an end portion on the left side (+Y side) of the peripheral wall portion 61a. The side plate portion 61b has a side plate portion body 61m and a first flange portion 61n. That is, the first housing member 61 has the side plate portion body 61m and the first flange portion 61n. The side plate portion body 61m includes the partition wall portion 61c and a protruding plate portion 61d.

The partition wall portion 61c is a front side (+X side) portion of the side plate portion body 61m. The partition wall portion 61c covers an opening on the left side (+Y side) of the peripheral wall portion 61a. In addition to the partition wall opening 68 described above, the partition wall portion 61c is provided with an insertion hole 61f through which the shaft 21 of the motor 2 is inserted. The protruding plate portion 61d is a rear side portion (−X side) of the side plate portion body 61m. The protruding plate portion 61d protrudes rearward from the peripheral wall portion 61a. The protruding plate portion 61d is provided with a first axle passage hole 61e through which the axle 55 for supporting the wheels passes.

The first flange portion 61n protrudes leftward (+Y side) from an outer peripheral edge portion of the side plate portion body 61m. The first flange portion 61n is provided over the entire circumference of the outer peripheral edge portion of the side plate portion body 61m. The first flange portion 61n has an annular shape surrounding the motor axis J2. The first flange portion 61n has a plurality of fixing portions 61p. The plurality of fixing portions 61p are spaced apart from one another along the entire circumference of the first flange portion 61n. The fixing portion 61p protrudes to the outside of the first flange portion 61n, that is, the outside in the radial direction. As illustrated in FIG. 2, the plurality of fixing portions 61p are portions of the first flange portion 61n that are fixed to a second flange portion 62b described later by screw members 60a.

The fourth flange portion 61q protrudes outward in the radial direction from an outer peripheral edge portion at an end portion on the right side (−Y side) of the peripheral wall portion 61a. The fourth flange portion 61q has an annular shape surrounding the motor axis J2. Similarly to the first flange portion 61n, the fourth flange portion 61q has a plurality of fixing portions that protrude outward in the radial direction. The plurality of fixing portions of the fourth flange portion 61q are portions of the fourth flange portion 61q that are fixed to a third flange portion 63b described later by screw members 60b.

The second housing member 62 is fixed to the left side (+Y side) of the first housing member 61 in the axial direction of the motor axis J2. More specifically, the second housing member 62 is fixed to the side plate portion 61b of the first housing member 61. The shape of the second housing member 62 is a concave shape that opens toward a side plate portion 61b side (right side, −Y side). An opening of the second housing member 62 is covered by the side plate portion 61b. The space between the second housing member 62 and the side plate portion 61b constitutes the gear chamber 82 that houses the gear unit 3.

As illustrated in FIG. 3, the second housing member 62 has a second housing member body 62a and the second flange portion 62b. The second housing member body 62a is a concave shape that opens toward the right side (−Y side). The second housing member body 62a is provided with a second axle passage hole 62e. The second axle passage hole 62e coincides with the first axle passage hole 61e when viewed from the axial direction.

The second flange portion 62b protrudes outward in the radial direction from an outer peripheral edge portion of the second housing member body 62a. The second flange portion 62b has an annular shape surrounding the motor axis J2. The second flange portion 62b has a plurality of fixing portions 62p. The plurality of fixing portions 62p are spaced apart from one another along the entire circumference of the second flange portion 62b. The fixing portion 62p protrudes to the outside of the second flange portion 62b, that is, the outside in the radial direction. The plurality of fixing portions 62p are portions of the second flange portion 62b that are fixed to the first flange portion 61n by the screw members 60a.

As illustrated in FIG. 2, the first flange portion 61n and the second flange portion 62b are fixed to each other by the plurality of screw members 60a. Each of the plurality of screw members 60a is tightened from the left side (+Y side) to the female screw hole provided in the fixing portion 61p of the first flange portion 61n through a through-hole provided in the fixing portion 62p of the second flange portion 62b, for example. As a result, the first housing member 61 and the second housing member 62 are fixed to each other.

The third housing member 63 is fixed to the right side (−Y side) of the first housing member 61 in the axial direction of the motor axis J2. More specifically, the third housing member 63 is fixed to a right end portion of the peripheral wall portion 61a via the fourth flange portion 61q. The third housing member 63 has a closing wall portion 63a and the third flange portion 63b. The closing wall portion 63a closes an opening on the right side of the first housing member 61 having the cylindrical shape. More specifically, the closing wall portion 63a closes the opening on the right side of the peripheral wall portion 61a. As illustrated in FIG. 3, a window portion 63c that passes through the closing wall portion 63a in the axial direction is provided in the closing wall portion 63a. The window portion 63c passes through the inside and the outside of the housing body 69.

The third flange portion 63b protrudes from an outer peripheral edge portion of the closing wall portion 63a toward the left side (+Y side). The third flange portion 63b is provided over the entire circumference of the outer peripheral edge portion of the closing wall portion 63a. The third flange portion 63b has an annular shape surrounding the motor axis J2. Similarly to the first flange portion 61n, the third flange portion 63b has a plurality of fixing portions that protrude outward in the radial direction. As illustrated in FIG. 2, the plurality of fixing portions of the third flange portion 63b are portions of the third flange portion 63b that are fixed to the fourth flange portion 61q by the screw members 60b.

The third flange portion 63b and the fourth flange portion 61q are fixed to each other by the plurality of screw members 60b. Each of the plurality of screw members 60b is tightened from the right side (−Y side) to the female screw hole provided in the fixing portion of the fourth flange portion 61q through the through-hole provided in the fixing portion of the third flange portion 63b, for example. As a result, the first housing member 61 and the third housing member 63 are fixed to each other.

In the present embodiment, the lid member 64 is a member that is formed by subjecting a plate-shaped member to press working. The lid member 64 is fixed to a right side (−Y side) surface of the third housing member 63. The lid member 64 covers the window portion 63c from the outside of the housing body 69. As illustrated in FIG. 3, the lid member 64 has a lid member body 64d, an axial protrusion 64c, and a plurality of radial protrusions 64a. The lid member body 64d has a plate shape in which the plate surface faces the axial direction. As illustrated in FIG. 2, an outer peripheral edge portion of the lid member body 64d is fixed to the third housing member 63 by screw members.

The axial protrusion 64c protrudes from the lid member body 64d in the axial direction. More specifically, the axial protrusion 64c protrudes from the lid member body 64d toward the right side (−Y side). As illustrated in FIGS. 2 and 3, in the present embodiment, the axial protrusion 64c has a substantially rectangular parallelepiped box shape that opens toward the left side (+Y side). The axial protrusion 64c is formed, for example, by ejecting a part of the plate-shaped lid member body 64d toward the right side (−Y side) by press working or the like. At least one of a part of the signal line 11 that transmits a detection result of the rotation angle sensor 9 to the inverter unit 8 and a part of a connector member that connects the rotation angle sensor 9 and the signal line 11 is housed inside the axial protrusion 64c.

The radial protrusion 64a protrudes outward in the radial direction from the outer peripheral edge portion of the lid member body 64d. As illustrated in FIG. 4, each of the plurality of radial protrusions 64a is provided with a through-hole 64b passing through the radial protrusion 64a in the axial direction. That is, the lid member 64 is provided with the plurality of through-holes 64b. The radial protrusions 64a and the through-holes 64b are provided, for example, four each.

As illustrated in FIG. 2, the housing 6 has a protrusion 61g that protrudes upward. In the present embodiment, the protrusion 61g protrudes upward from the outer peripheral surface of the first housing member 61. More specifically, the protrusion 61g protrudes upward from the flat surface 61t. In the present embodiment, the protrusion 61g has a cylindrical shape that opens upward. The inside of the cylindrical protrusion 61g constitutes a female screw hole 61h. That is, the protrusion 61g has the female screw hole 61h. The female screw hole 61h is recessed downward from an upper end surface of the protrusion 61g. The female screw hole 61h is a hole having a bottom portion on a lower side thereof.

An eye bolt (not illustrated) can be tightened into the female screw hole 61h. Note that the term "eye bolt" in the present specification is not particularly limited as long as the bolt has a hole in a screw head. The eye bolt to be tightened into the female screw hole 61h is used for suspending the motor unit 1, for example. In this case, a wire, a hook, or the like is hooked on the hole of the eye bolt. Accordingly, the motor unit 1 can be suspended when the motor unit 1 is attached to the vehicle, when the motor unit 1 is maintained, or the like. Therefore, it is possible to improve workability such as an attachment operation of the motor unit 1 to the vehicle, maintenance work of the motor unit 1, and the like.

In the present embodiment, the protrusion 61g and the female screw hole 61h are located on the left side (+Y side) relative to the center of the housing 6 in the axial direction of the motor axis J2. Here, in the present embodiment, the reduction gear 4 is located on the left side of the motor 2 in the axial direction of the motor axis J2. In this case, the center of gravity of the motor unit 1 tends to be closer to the left side. Therefore, by arranging the female screw hole 61h on the left side relative to the axial center of the housing 6, it is easy to arrange the female screw hole 61h at a position that coincides with or is close to the center of gravity of the motor unit 1 when viewed from the vertical direction. Accordingly, when the motor unit 1 is suspended through the eye bolt tightened in the female screw hole 61h, the motor unit 1 can be stably suspended.

In the present embodiment, the protrusion 61g and the female screw hole 61h are located on the rear side (−X side) relative to the center of the housing 6 in the back-forth direction. Here, in the present embodiment, the inverter unit 8 is fixed to the rear side of the housing 6. In this case, the center of gravity of the motor unit 1 tends to be closer to the rear side. Therefore, by arranging the female screw hole 61h on the rear side relative to the axial center of the housing 6, it is easy to arrange the female screw hole 61h at a position that coincides with or is close to the center of gravity of the motor unit 1 when viewed from the vertical direction. Accordingly, when the motor unit 1 is suspended through the eye bolt tightened in the female screw hole 61h, the motor unit 1 can be stably suspended.

In the present embodiment, the protrusion 61g and the female screw hole 61h are located at the position that coincides with the center of gravity of the motor unit 1 when viewed from the vertical direction. Therefore, when the motor unit 1 is suspended through the eye bolt tightened in the female screw hole 61h, the motor unit 1 can be more stably suspended.

The housing 6 has at least one circumferential rib 61i extending along the circumferential direction. In the present embodiment, the circumferential rib 61i is provided on the outer peripheral surface of the first housing member 61. More specifically, the circumferential rib 61i is provided on the flat surface 61t of the outer peripheral surface of the peripheral wall portion 61a. In the present embodiment, the circumferential rib 61i protrudes upward, and extends in the back-forth direction. In the present embodiment, a plurality of circumferential ribs 61i are spaced apart from one another in the axial direction. The circumferential rib 61*i* is provided as, for example, three circumferential ribs 61*ia*, 61*ib*, and 61*ic*.

At least one of the circumferential ribs 61*i* is connected to the protrusion 61*g*. In the present embodiment, the circumferential rib 61*ia* is connected to the protrusion 61*g*. Therefore, the protrusion 61*g* and a portion of the housing 6 around the protrusion 61*g* can be rigidly connected, and strength of the housing 6 at the protrusion 61*g* and the portion around the protrusion 61*g* can be improved. Accordingly, when the motor unit 1 is suspended by tightening the eye bolt in the female screw hole 61*h*, deformation of the housing 6 can be suppressed even when a comparatively large load is applied to the protrusion 61*g*. Therefore, it is possible to suspend the motor unit 1 while suppressing the deflection of the housing 6.

Further, since the circumferential rib 61*ia* is connected to the protrusion 61*g*, when the housing 6 is molded by die casting, molten metal can be easily flowed into a portion of a metal mold where the protrusion 61*g* is molded through a portion of the metal mold where the circumferential rib 61*ia* is molded. As a result, the flow of the molten metal at the time of molding the housing 6 can be improved. Therefore, the housing 6 can be molded with high accuracy by die casting.

In the present embodiment, the one circumferential rib 61*ia* among the three circumferential ribs 61*ia*, 61*ib*, and 61*ic* is connected to the protrusion 61*g*. In the present embodiment, the circumferential rib 61*ia* connected to the protrusion 61*g* is the circumferential rib 61*i* located on the leftmost side (+Y side). The circumferential rib 61*ia* connected to the protrusion 61*g* is connected to an outer peripheral surface of the protrusion 61*g* at an end portion on the rear side (−X side). A protruding height of the circumferential rib 61*i* is, for example, smaller than a protruding height of the protrusion 61*g*. That is, an upper end portion of the circumferential rib 61*i* is located lower than the upper end portion of the protrusion 61*g*. The two circumferential ribs 61*ib* and 61*ic* other than the circumferential rib 61*ia* connected to the protrusion 61*g* of the three circumferential ribs 61*i* are arranged apart from each other on the right side (−Y side) of the protrusion 61*g*.

In the present embodiment, since the circumferential rib 61*i* protrudes upward, when the housing 6 is molded by die casting, the circumferential rib 61*i* can be molded together with the protrusion 61*g* by the metal mold that is pulled upward. In addition, in the present embodiment, the circumferential rib 61*ib* has the same axial position as a fifth convex portion 61*r* described later. Accordingly, the strength of the housing 6 can be further improved by the fifth convex portion 61*r* and the circumferential rib 61*ib*.

In the present embodiment, the housing 6 has a first convex portion 61*j*, a second convex portion 62*j*, a third convex portion 63*k*, and a fourth convex portion 61*k*. The first convex portion 61*j* and the fourth convex portion 61*k* are provided on the first housing member 61. That is, the first housing member 61 has the first convex portion 61*j* and the fourth convex portion 61*k*. The second convex portion 62*j* is provided on the second housing member 62. That is, the second housing member 62 has the second convex portion 62*j*. The third convex portion 63*k* is provided on the third housing member 63. That is, the third housing member 63 has the third convex portion 63*k*.

The first convex portion 61*j*, the second convex portion 62*j*, the third convex portion 63*k*, and the fourth convex portion 61*k* protrude in a direction orthogonal to the motor axis J2. In the present embodiment, the first convex portion 61*j*, the second convex portion 62*j*, the third convex portion 63*k*, and the fourth convex portion 61*k* are plate-shaped with their plate surfaces facing the axial direction. The first convex portion 61*j*, the second convex portion 62*j*, the third convex portion 63*k*, and the fourth convex portion 61*k* are substantially semi-elliptical shape when viewed from the axial direction, for example. In the present embodiment, the first convex portion 61*j*, the second convex portion 62*j*, the third convex portion 63*k*, and the fourth convex portion 61*k* are located above the motor axis J2.

In the present embodiment, the first convex portion 61*j* protrudes from the first flange portion 61*n* toward the front side (+X side). The first convex portion 61*j* is provided between the fixing portions 61*p* of the first flange portion 61*n*. The first convex portion 61*j* protrudes obliquely forward and upward from between the fixing portions 61*p* of the first flange portion 61*n*.

In the present embodiment, the second convex portion 62*j* protrudes from the second flange portion 62*b* toward the front side (+X side). The second convex portion 62*j* is provided between the fixing portions 62*p* of the second flange portion 62*b*. The second convex portion 62*j* protrudes obliquely forward and upward from between the fixing portions 62*p* of the second flange portion 62*b*.

In the present embodiment, the third convex portion 63*k* protrudes from the third flange portion 63*b* toward the front side (+X side). The third convex portion 63*k* is provided between the fixing portions of the third flange portion 63*b*. The third convex portion 63*k* protrudes obliquely forward and upward from between the fixing portions of the third flange portion 63*b*.

In the present embodiment, the fourth convex portion 61*k* protrudes from the fourth flange portion 61*q* toward the front side (+X side). The fourth convex portion 61*k* is provided between the fixing portions of the fourth flange portion 61*q*. The fourth convex portion 61*k* protrudes obliquely forward and upward from between the fixing portions of the fourth flange portion 61*q*.

The first convex portion 61*j* and the second convex portion 62*j* face each other with a gap interposed therebetween in the axial direction. Therefore, the operator or the like grasps the first convex portion 61*j* and the second convex portion 62*j*, respectively, in a state in which the plurality of screw members 60*a* are removed, and applies a force in a direction in which the first convex portion 61*j* and the second convex portion 62*j* are separated from each other in the axial direction, so that the first housing member 61 and the second housing member 62 can be pulled away from each other. Accordingly, the first housing member 61 and the second housing member 62 can be easily detached during maintenance of the motor unit 1 or the like.

Note that, in the present specification, the term "operator or the like" includes an operator, an apparatus, and the like for performing the respective operations. Each operation may be performed by only the operator, by only the apparatus, or by both the operator and the apparatus.

According to the present embodiment, the first convex portion 61*j* is provided between the fixing portions 61*p*, and the second convex portion 62*j* is provided between the fixing portions 62*p*. Since the fixing portions 61*p* and 62*p* are fixed by the screw members 60*a*, the fixing portions 61*p* and 62*p* are provided with the through-holes through which the screw members 60*a* are passed or with female screw holes into which the screw members 60*a* are tightened. Therefore, the fixing portions 61*p* and 62*p* protrude outward from other portions of the respective flange portions. Thus, by providing the first convex portion 61*j* and the second convex portion 62*j* between the fixing portions 61*p* and 62*p*, respectively, it is possible to provide the first convex portion 61*j* and the second convex portion 62*j* in the non-protrusions of respective flange portions. Accordingly, even when the first convex portion 61*j* and the second convex portion 62*j* are provided, it is possible to suppress an increase in the outer dimensions of the motor unit 1.

In the present embodiment, the first convex portion 61*j* and the second convex portion 62*j* are located inside the outer shape of the housing 6 when viewed from the vertical direction, and are located inside the outer shape of the housing 6 when viewed from the back-forth direction orthogonal to both the vertical direction and the axial direction. That is, the first convex portion 61*j* and the second convex portion 62*j* are not arranged at an end portion in the vertical direction and an end portion in the back-forth direction of the motor unit 1. Therefore, even when the first convex portion 61*j* and the second convex portion 62*j* are provided, the dimension in the vertical direction and the dimension in the back-forth direction of the motor unit 1 do not increase. Thus, even when the first convex portion 61*j* and the second convex portion 62*j* are provided, it is possible to further suppress an increase in the outer dimensions of the motor unit 1.

In the present embodiment, specifically, the first convex portion 61*j* and the second convex portion 62*j* are arranged on the rear side relative to a front end of the fifth convex portion 61*r* in the housing 6. The fifth convex portion 61*r* is a portion in which an upper portion of a third flow path 92*c* of the housing 6, which will be described later, is provided. The fifth convex portion 61*r* protrudes from the peripheral wall portion 61*a* toward the front side (+X side). The fifth convex portion 61*r* linearly extends in a direction inclined obliquely in the back-forth direction with respect to the vertical direction. The fifth convex portion 61*r* is located on the rear side (−X side) from the lower side toward the upper side.

The third convex portion 63*k* and the fourth convex portion 61*k* face each other with a gap interposed therebetween in the axial direction. Therefore, in the same manner as the first convex portion 61*j* and the second convex portion 62*j* described above, by applying a force in a separating direction to each of the third convex portion 63*k* and the fourth convex portion 61*k* in the axial direction, the first housing member 61 and the third housing member 63 can be pulled away from each other. Accordingly, the first housing member 61 and the third housing member 63 can be easily detached during maintenance of the motor unit 1 or the like.

Further, according to the present embodiment, the third convex portion 63*k* is provided between the fixing portions in the third flange portion 63*b*, and the fourth convex portion 61*k* is provided between the fixing portions in the fourth flange portion 61*q*. Therefore, similarly to the first convex portion 61*j* and the second convex portion 62*j* described above, even when the third convex portion 63*k* and the fourth convex portion 61*k* are provided, it is possible to suppress an increase in the outer dimensions of the motor unit 1.

In the present embodiment, the third convex portion 63*k* and the fourth convex portion 61*k* are located inside the outer shape of the housing 6 when viewed from the vertical direction, and are located inside the outer shape of the housing 6 when viewed from the back-forth direction orthogonal to both the vertical direction and the axial direction. That is, the third convex portion 63*k* and the fourth convex portion 61*k* are not arranged at the end portion in the vertical direction and the end portion in the back-forth direction of the motor unit 1. Therefore, even when the third convex portion 63*k* and the fourth convex portion 61*k* are provided, it is possible to suppress an increase in the outer dimensions of the motor unit 1. In the present embodiment, specifically, the third convex portion 63*k* and the fourth convex portion 61*k* are arranged on the rear side (−X side) relative to the front end of the fifth convex portion 61*r* in the housing 6.

In the present embodiment, the first convex portion 61*j*, the second convex portion 62*j*, the third convex portion 63*k*, and the fourth convex portion 61*k* are located at substantially the same position in the vertical direction. That is, in the present embodiment, the first convex portion 61*j*, the second convex portion 62*j*, the third convex portion 63*k*, and the fourth convex portion 61*k* have portions each having the same vertical position. Therefore, it is easy to perform the operation of detaching the first housing member 61 and the second housing member 62 via the first convex portion 61*j* and the second convex portion 62*j* and the operation of detaching the first housing member 61 and the third housing member 63 via the third convex portion 63*k* and the fourth convex portion 61*k* simultaneously or successively.

As illustrated in FIG. 1, the oil O circulates inside an oil path 90 provided in the housing 6. The oil path 90 is a path of the oil O for supplying the oil O from the oil sump P to the motor 2. The oil path 90 circulates the oil O to cool the motor 2. The oil O is used for lubricating the reduction gear 4 and the differential gear 5. Further, the oil O is used for cooling the motor 2. The oil O is collected in a lower region (that is, the oil sump P) inside the gear chamber 82. Since the oil O functions as a lubricant and a cooling oil, it is preferable to use an oil equivalent to an automatic transmission fluid (ATF) having low viscosity.

As illustrated in FIG. 1, the oil path 90 is provided in the housing 6. A part of the oil path 90 is located in the housing space 80 inside the housing 6. The oil path 90 is configured to extend across the motor chamber 81 and the gear chamber 82 which constitute the housing space 80. The oil path 90 is a path of the oil O that guides the oil O from the oil sump P provided in the lower region inside the gear chamber 82 through the motor 2 to the oil sump P again.

Note that, in the present specification, the "oil path" means a path of the oil O that circulates in the housing space 80. Therefore, the "oil path" is a concept including not only a "flow path" that constantly forms a steady oil flowing in one direction, but also a path in which oil is temporarily retained (for example, a reservoir) and a path through which the oil drips.

The oil path 90 has a first oil path 91 that passes through the inside of the motor 2 and a second oil path 92 that passes through the outside of the motor 2. The oil O cools the motor 2 from the inside and the outside in the first oil path 91 and the second oil path 92, respectively.

In the first oil path 91, the oil O is lifted up by the differential gear 5 from the oil sump P, temporarily stored in a first reservoir 93, and then guided to the inside of the rotor 20. Centrifugal force associated with the rotation of the rotor 20 is applied to the oil O inside the rotor 20. As a result, the oil O is uniformly diffused toward the stator 30 surrounding the rotor 20 from the outside in the radial direction, and cools the stator 30.

The oil O reaching the stator 30 takes heat from the stator 30. The oil O that has cooled the stator 30 drops downward, and collects in the lower region inside the motor chamber 81. The oil O collected in the lower region inside the motor chamber 81 moves to the oil sump P inside the gear chamber 82 via the partition wall opening 68 provided in the partition wall portion 61*c*.

In the second oil path 92, the oil O is pulled up from the oil sump P to the upper side of the motor 2, and is supplied to the motor 2. The oil O supplied to the motor 2 takes heat from the stator 30 to cool the motor 2 while flowing along the outer peripheral surface of the stator 30. The oil O, which has flowed along the outer peripheral surface of the stator 30, drops downward and collects in the lower region inside the motor chamber 81. The oil O in the second oil path 92 joins the oil O in the first oil path 91 in the lower region inside the motor chamber 81. The oil O collected in the lower region inside the motor chamber 81 moves to the lower region inside the gear chamber 82 (that is, the oil sump P) via the partition wall opening 68. In the second oil path 92, a pump 96, a cooler 97, and a second reservoir 98 are provided. The second oil path 92 has a first flow path 92*a*, a second flow path 92*b*, and a third flow path 92*c*.

The first flow path 92*a*, the second flow path 92*b*, and the third flow path 92*c* are provided in the wall portion of the housing 6. Therefore, it is not necessary to separately prepare pipe members constituting the respective flow paths, and it is possible to suppress an increase in the number of components of the motor unit 1. The first flow path 92*a* connects the oil sump P and the pump 96. The second flow path 92*b* connects the pump 96 and the cooler 97.

The third flow path 92*c* extends upward from the cooler 97. Although not illustrated, the third flow path 92*c* has a supply port that opens inside the motor chamber 81 at an upper side of the stator 30. The supply port supplies the oil O to the inside of the motor chamber 81.

In the present embodiment, the third flow path 92*c* extends along the circumferential direction of the motor axis J2 inside the peripheral wall portion 61*a*. In addition, the axial position of the third flow path 92*c* coincides with the axial position of the stator 30. That is, the positions in the axial direction of the third flow path 92*c* and the stator 30 coincide with each other. For this reason, the stator 30 can be cooled by the oil O passing through the third flow path 92*c*. In particular, the oil O immediately after passing through the cooler 97 flows through the third flow path 92*c*. Therefore, according to the present embodiment, it is possible to efficiently cool the stator 30 by the oil O flowing through the third flow path 92*c*.

The third flow path 92*c* is located substantially in the center of the stator 30 in the axial direction. For this reason, the effect of cooling by the oil O flowing through the third flow path 92*c* can be more efficiently applied to the entire area in the axial direction of the stator 30. The third flow path 92*c* surrounds the stator 30 from the outside in the radial direction in a range of an angle θ1 centered on the motor axis J2. The angle θ1 is preferably 45° or more, and more preferably 90° or more. That is, the third flow path 92*c* preferably surrounds a range of 45° or more in the circumferential direction of the motor 2, and more preferably surrounds a range of 90° or more. Thereby, the stator 30 can be efficiently cooled by using the cooled oil O flowing through the third flow path 92*c*. As illustrated in FIG. 2, an upper portion of the third flow path 92*c* is located inside the fifth convex portion 61*r* provided on the peripheral wall portion 61*a*.

The pump 96 circulates the oil O in the second oil path 92. The pump 96 is an electric pump that is driven by electricity. The pump 96 is provided on the outer peripheral surface of the housing 6. The pump 96 has a pump motor 96*m*. The pump 96 sucks up the oil O from the oil sump P through the first flow path 92*a*, and supplies the oil O to the motor 2 via the second flow path 92*b*, the cooler 97, the third flow path 92*c*, and the second reservoir 98.

The cooler 97 cools the oil O in the second oil path 92. The cooler 97 is provided on the outer peripheral surface of the housing 6. A cooling water pipe 97*j* that allows cooling water cooled by a radiator (not illustrated) to pass therethrough is connected to the cooler 97. The oil O passing through the inside of the cooler 97 is cooled by exchanging heat with the cooling water passing through the cooling water pipe 97*j*. Note that the inverter unit 8 is provided in the path of the cooling water pipe 97*j*. The cooling water passing through the cooling water pipe 97*j* cools the inverter unit 8.

The second reservoir 98 is located in the motor chamber 81 which constitutes the housing space 80. The second reservoir 98 temporarily stores the oil pulled up from the oil sump P to the upper side of the motor 2 by the pump 96. The second reservoir 98 stores the oil O supplied from the cooler 97 to the motor chamber 81 via the third flow path 92*c*. The second reservoir 98 is located on an upper side of the motor. The second reservoir 98 has a plurality of outlets 98*a*. The oil O collected inside the second reservoir 98 is supplied to the motor 2 from the respective outlets 98*a*. The oil O flowing out from the outlets 98*a* of the second reservoir 98 flows along the outer peripheral surface of the motor 2 from the upper side toward the lower side to take the heat of the motor 2. As a result, the entire motor 2 can be cooled.

Note that, as illustrated in FIG. 2, a part of the first housing member 61 in the circumferential direction has a bulging portion 61*s* bulging outward in the radial direction. By providing the bulging portion 61*s*, the second reservoir 98 can be housed between the inner peripheral surface of the housing 6 and the outer peripheral surface of the stator 30. Here, a position of a radially outer end portion of the bulging portion 61*s* is located radially inward relative to the radially outer end portion of the fifth convex portion 61*r* in which the third flow path 92*c* is provided. Accordingly, the second reservoir 98 can be housed without increasing the outermost diameter of the housing 6.

The inverter unit 8 is fixed to the outer peripheral surface of the housing 6 that faces outward in the radial direction. In the present embodiment, the inverter unit 8 is fixed to the rear side of the housing 6 in the back-forth direction. The inverter unit 8 is electrically connected to the motor 2 via a bus bar (not illustrated). The inverter unit 8 controls the rotation of the motor 2.

As illustrated in FIG. 4, the motor unit 1 includes the signal line 11, a power supply line 12, and a hose 13 as a plurality of flexible linear members that are arranged along the outer peripheral surface of the housing 6.

The signal line 11 connects the rotation angle sensor 9 and the inverter unit 8. The signal line 11 is an example of the flexible linear member. The signal line 11 transmits a detection result of the rotation angle sensor 9 to the inverter unit 8. The inverter unit 8 controls a current supplied to the motor 2 based on a rotation angle of the rotor 20 detected by the rotation angle sensor 9.

The power supply line 12 connects the inverter unit 8 and the pump 96. The power supply line 12 is an example of the flexible linear member. The power supply line 12 supplies electric power from the inverter unit 8 to the pump 96. More specifically, the inverter unit 8 supplies electric power to the pump motor 96*m* (see FIG. 1) of the pump 96 to control the driving of the pump 96. The signal line 11 and the power supply line 12 are tied by a first cable tie 66.

The hose 13 connects the cooler 97 and the inverter unit 8. The hose 13 is an example of the flexible linear member.

The oil O that passes through the inside of the cooler 97 and a refrigerant (cooling water) that cools the inverter unit 8 flow through the hose 13. The hose 13 is a part of the cooling water pipe 97j. As illustrated in FIG. 1, the cooling water pipe 97j has a pipe path that passes through the inverter unit 8 and the cooler 97 from the radiator (not illustrated) and returns to the radiator. The cooling water pipe 97j cools the oil O in the inverter unit 8 and the cooler 97 by the refrigerant flowing inside. The hose 13 corresponds to a pipe path from the inverter unit 8 to the cooler 97 of the cooling water pipe 97j.

As illustrated in FIG. 4, the inverter unit 8 has a facing surface 8f facing the outer peripheral surface of the housing 6, and a connection surface 8a orthogonal to the facing surface 8f. The connection surface 8a extends along a plane orthogonal to the axial direction.

A first terminal connection portion 8b to which the signal line 11 is connected, a second terminal connection portion 8c to which the power supply line 12 is connected, and a hose connection portion 8d to which the hose 13 is connected are arranged on the connection surface 8a.

The first terminal connection portion 8b and the second terminal connection portion 8c are aligned along the ridgeline of the connection surface 8a and the facing surface 8f. That is, the first terminal connection portion 8b and the second terminal connection portion 8c are aligned on the connection surface 8a along the outer peripheral surface of the housing 6. According to the present embodiment, the signal line 11 and the power supply line 12 can be brought close to each other in the vicinity of the inverter unit 8. Accordingly, the signal line 11 and the power supply line 12 can be tied by the first cable tie 66. Consequently, flapping of the signal line 11 and the power line 12 can be suppressed.

Note that the hose connection portion 8d of the present embodiment is not arranged along the outer peripheral surface of the housing 6. However, the hose connection portion 8d may be arranged along the outer peripheral surface of the housing 6 together with the first terminal connection portion 8b and the second terminal connection portion 8c. In this case, the first cable tie 66 can tie the hose 13 together with the signal line 11 and the power supply line 12.

As illustrated in FIG. 4, the signal line 11, the power supply line 12, and the hose 13 are held by the lid member 64 of the housing 6 by a plurality of second cable ties (cable ties, holding portions) 65. Each of the plurality of second cable ties 65 is passed through through-holes 64b provided in the plurality of radial protrusions 64a, and is wound around at least one among the signal line 11, the power line 12, and the hose 13. Accordingly, the second cable ties 65 fix the signal line 11, the power supply line 12, and the hose 13 to the lid member 64.

In the present embodiment, the number of the second cable ties 65 is four. In the present embodiment, two second cable ties 65 among the four second cable ties 65 tie and hold the power supply line 12 and the hose 13. The power supply line 12 and the hose 13 extend from the connection surface 8a of the inverter unit 8 toward the lower side of the motor 2. Further, the power supply line 12 and the hose 13 are routed along the peripheral edge of the lid member 64 in a common path. The power supply line 12 and the hose 13 are tied and held by the second cable ties 65 in a portion that is routed along the peripheral edge of the lid member 64. For this reason, it is possible to reduce the number of the second cable ties 65 and shorten the time required for the process of fixing by the second cable ties 65.

On the other hand, the signal line 11 is connected to a surface that faces the upper side of the housing 6. Therefore, the signal line 11 has a short common path with the power supply line 12 and the hose 13. The signal line 11 is independently fixed to the lid member 64 by the second uppermost cable tie 65 among the plurality of second cable ties 65.

Note that in the present embodiment, the signal line 11 and the power supply line 12 are tied together with the first cable tie 66. However, by adjusting the routing of the signal line 11 and the power line 12, the signal line 11 and the power supply line 12 may be tied and fixed by the second cable tie 65.

According to the present embodiment, the plate-shaped lid member body 64d is provided with the second cable ties (holding portions) 65 for holding the linear member (at least one among the signal line 11, the power supply line 12, and the hose 13). Since the lid member body 64d has a plate shape, it is easy to process. More specifically, by manufacturing the lid member body 64d by press working, the through-hole 64b through which the second cable tie 65 passes can be easily provided without increasing the manufacturing process. Therefore, according to the motor unit 1 of the present embodiment, the linear members can be held by a simple structure, and the flapping of the linear members can be suppressed.

Figure 5:
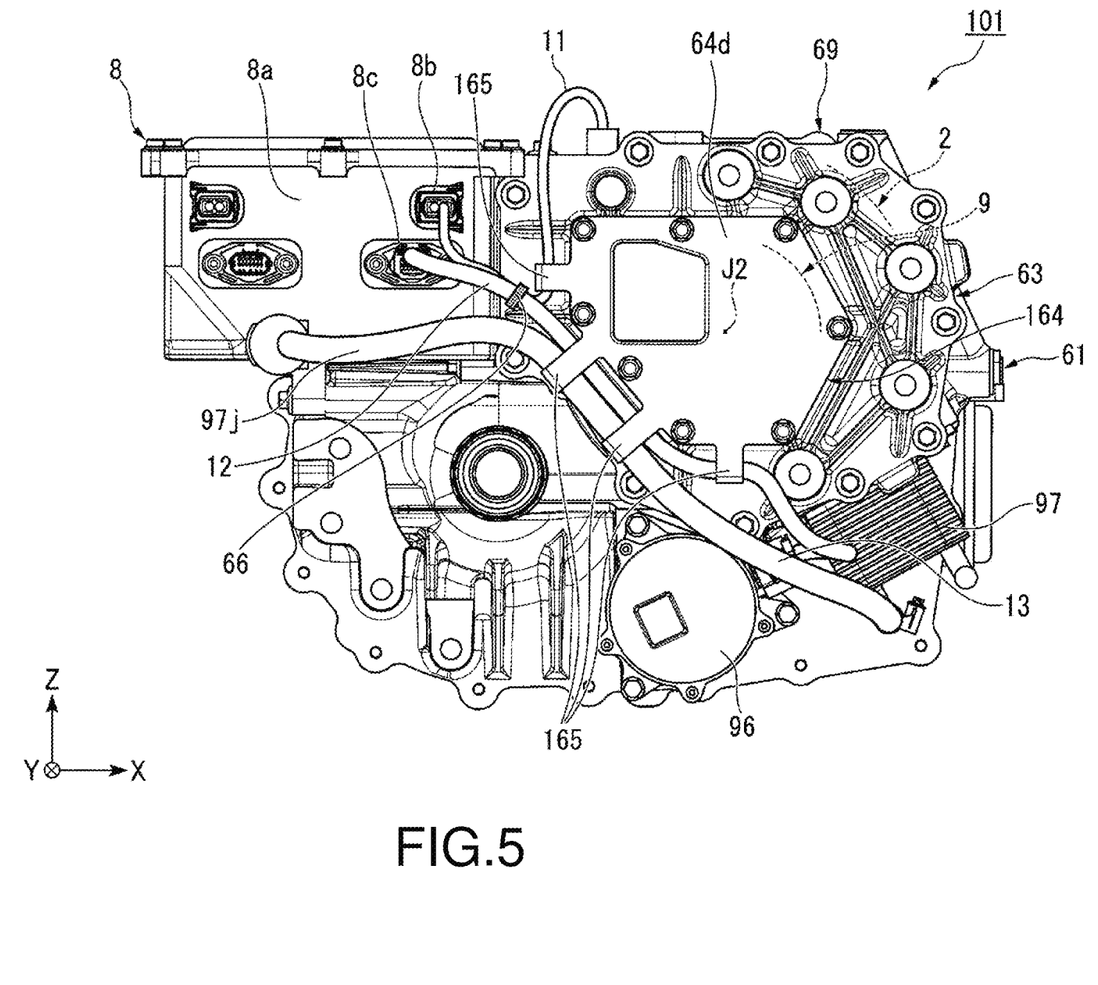
FIG. 5 is a side view of a motor unit according to a first modification of the embodiment.

FIG. 5 is a side view of a motor unit (driving device) 101 including a lid member 164 of a first modification.

The lid member 164 of the first modification differs from the above-described embodiment mainly in the configuration of a holding portion 165. Note that constituent elements in the same manner as those in the above-described embodiment are denoted by the same reference numerals, and description thereof will be omitted.

The lid member 164 is provided with a plurality of holding portions 165 for holding the linear member (at least one among the signal line 11, the power supply line 12, and the hose 13).

In the first modification, the lid member 164 and the holding portion 165 are a single member. The lid member 164 and the holding portion 165 have a plate shape. The lid member 164 and the holding portion 165 are made of a metal material. The lid member 164 and the holding portion 165 are manufactured by press working.

The holding portion 165 protrudes outward in the radial direction from the peripheral edge of the lid member 164. The holding portion 165 extends in a rectangular shape toward the outside in the radial direction. The holding portion 165 is bent toward the rear side (left side, +Y side) of the paper surface of FIG. 5. Accordingly, the holding portion 165 is wound around the linear member (at least one among the signal line 11, the power supply line 12, and the hose 13).

The process of winding the holding portion 165 around the linear member is performed by an operator or the like who performs an assembling process. In the assembling process, the operator or the like arranges the linear member along the peripheral edge of the lid member 164. At this stage, the holding portion 165 extends linearly along a plane orthogonal to the radial direction. Next, the operator or the like bends the holding portion 165 such that the holding portion 165 winds around the linear member. By performing the above-described processes, the linear member can be held by the lid member 164.

According to the first modification, the holding portion 165 holding the linear member (at least one among the signal line 11, the power line 12, and the hose 13) is provided with the plate-shaped lid member 164. Since the holding portion 165 has a plate shape, it is easy to process. Therefore, by bending the holding portion 165, the linear member can be fixed to the lid member 164 without an increase in the number of components. That is, according to the motor unit 101 of the first modification, the linear member can be held by a simple structure, and the flapping of the linear member can be suppressed.

Figure 6:
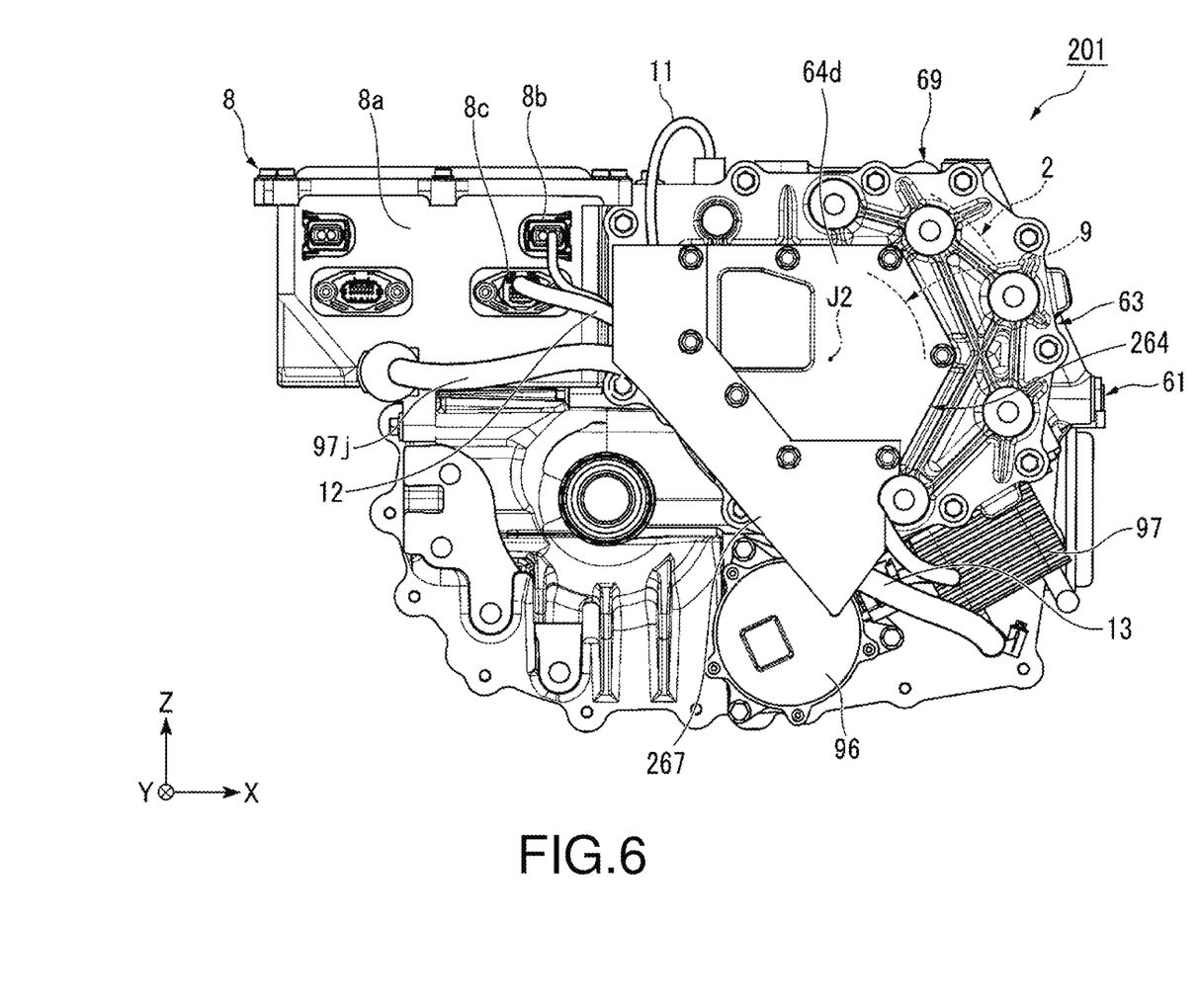
FIG. 6 is a side view of a motor unit according to a second modification of the embodiment.

FIG. 6 is a side view of a motor unit (driving device) 201 including a lid member 264 of a second modification.

The lid member 264 of the second modification differs from the above-described embodiment mainly in the configuration of the holding portion. Note that constituent elements in the same manner as those in the above-described embodiment are denoted by the same reference numerals, and description thereof will be omitted.

A cover member 267 that covers the linear member (at least one among the signal line 11, the power supply line 12, and the hose 13) is attached to the lid member 264. In the second modification, the lid member 264 and the cover member 267 are separate members. The cover member 267 has a plate shape having a plate surface facing the axial direction. The cover member 267 is made of a metal material or a resin material. The cover member 267 is arranged on the side opposite to the output side of the motor 2 (−Y side) with respect to the housing body 69. That is, the cover member 267 is arranged on the opposite side to the side on which the reduction gear 4 is arranged, with respect to the motor 2.

The cover member 267 extends in a direction inclined obliquely in the back-forth direction with respect to the vertical direction. The cover member 267 is located on the front side (+X side) from the upper side toward the lower side. The cover member 267 is fixed to the lid member body 64d of the lid member 264 by, for example, a plurality of screw members. More specifically, the cover member 267 is screwed to the edge portion on the rear side (−X side) and the edge portion on the lower side of the lid member body 64d. The cover member 267 protrudes toward the rear side and the lower side relative to the lid member body 64d.

The cover member 267 covers the linear member (at least one among the signal line 11, the power supply line 12, and the hose 13) from the right side (−Y side). Therefore, it is possible to protect the linear member by the cover member 267, and it is possible to prevent the linear member from being damaged when the motor unit 201 is maintained or when a foreign object approaches the motor unit 201, for example. The foreign object includes, for example, a stone and the like that are flipped up by a wheel when a vehicle travels. Further, since at least a portion of the linear member can be covered by the cover member 267, it is possible to further improve an aesthetic appearance of the motor unit 201.

In the second modification, the cover member 267 covers a part of the signal line 11, a part of the power supply line 12, and a part of the hose 13 from the right side. Thereby, the signal line 11, the power line 12, and the hose 13 can be protected by the cover member 267, and damage to the signal line 11, the power supply line 12, and the hose 13 can be suppressed.

The holding portion that holds the linear members, the signal line 11, the power supply line 12, and the hose 13, in the second modification, may be provided on the lid member 264, similarly to the above-described motor units 1 and 101, may be provided on the cover member 267, or may be provided on both the lid member 264 and the cover member 267. When the holding portion is provided on the cover member 267, the holding portion is provided, for example, on a back surface of the cover member 267. The back surface of the cover member 267 is a surface facing the housing body 69 side (left side, +Y side) among the surfaces of the cover member 267. The holding portion provided on the cover member 267 extends from the rear surface of the cover member 267 toward the housing body 69 side, for example.

Although the embodiment and modifications of the present disclosure have been described above, each configuration and the combination thereof in the embodiments are mere examples, and additions, omissions, substitutions, and other changes of the configuration can be made without departing from the spirit of the present disclosure. The present disclosure may also employ, for example, the following configurations.

The protrusion may have a female screw hole into which the eye bolt is tightened, and may protrude toward the upper side. In the above-described embodiment, the protrusion 61g has the configuration in which the protrusion 61g protrudes upward from the first housing member 61, but the present disclosure is not limited to the configuration. The protrusion may protrude upward from the upper surface of the second housing member, or may protrude upward from the upper surface of the third housing member. The shape of the protrusion is not particularly limited and may not be a tubular shape. The protrusion may have a quadrangular column shape or the like having a female screw hole. A plurality of protrusions may be provided.

The female screw holes into which the eye bolts are tightened may be provided at two or more positions. In this case, the plurality of female screw holes may be provided in one protrusion, or may be provided in each of the plurality of protrusions. When two female screw holes are provided, the center of gravity of the motor unit may be located on a line segment connecting the two female screw holes when viewed from the vertical direction. In a case where two or more female screw holes are provided, the center of gravity of the motor unit may be positioned inside the virtual polygon formed by connecting the female screw holes with the line segments when viewed from the vertical direction.

The circumferential rib is not particularly limited as long as it includes at least one circumferential rib connected to the protrusion. The number of circumferential ribs may be one or two, or may be four or more. A plurality of circumferential ribs may connect to the one protrusion.

The first convex portion is not particularly limited as long as it is provided on the first housing member and faces the second convex portion with a gap interposed therebetween in the axial direction. The second convex portion is not particularly limited as long as it is provided on the second housing member and faces the first convex portion with a gap interposed therebetween in the axial direction. The third convex portion is not particularly limited as long as it is provided on the third housing member and faces the fourth convex portion with a gap interposed therebetween in the axial direction. The fourth convex portion is not particularly limited as long as it is provided on the first housing member and faces the third convex portion with a gap interposed therebetween in the axial direction. The third convex portion and the fourth convex portion may be arranged at a position different from the first convex portion and the second convex portion in the vertical direction. The first convex portion and the second convex portion may not be provided. The third convex portion and the fourth convex portion may not be provided.

Each of the configurations described in this specification may be combined as appropriate within a range not inconsistent with each other.

The invention claimed is:

1. A driving device for rotating an axle of a vehicle, the driving device comprising:
a motor having a rotor rotating about a motor axis extending in a horizontal direction orthogonal to a vertical direction;
a reduction gear connected to the rotor;
a differential gear connected to the motor via the reduction gear; and
a housing configured to house the motor, the reduction gear, and the differential gear therein,
wherein the housing includes:
a protrusion protruding upward in the vertical direction; and
at least one of circumferential ribs extending along a circumferential direction; and
the protrusion has a female screw hole capable of tightening an eye bolt, and
at least one of the circumferential ribs is connected to the protrusion.

2. The driving device according to claim 1,
wherein the reduction gear is located on one side of the motor in an axial direction of the motor axis, and
the female screw hole is located on the one side relative to a center of the housing in the axial direction of the motor axis.

3. The driving device according to claim 1 or 2, further comprising:
an inverter unit fixed to one side of the housing in a predetermined direction orthogonal to both the vertical direction and the axial direction of the motor axis,
wherein the female screw hole is located on the one side in the predetermined direction relative to a center of the housing in the predetermined direction.

4. The driving device according to claim 1,
wherein the female screw hole is located at a position coinciding the center of gravity of the driving device when viewed from the vertical direction.

5. The driving device according to claim 1,
wherein the housing includes:
a first housing member; and
a second housing member fixed to one side of the first housing member in the axial direction of the motor axis, and
the first housing member has a first convex portion that protrudes in a direction orthogonal to the motor axis,
the second housing member has a second convex portion that protrudes in the direction orthogonal to the motor axis, and
the first convex portion and the second convex portion face each other with a gap interposed therebetween in the axial direction of the motor axis.

6. The driving device according to claim 5,
wherein the first housing member has an annular first flange portion surrounding the motor axis,
the second housing member has an annular second flange portion surrounding the motor axis,
the first flange portion and the second flange portion are fixed to each other by a plurality of screw members,
the first convex portion is provided between portions of the first flange portion that are fixed to the second flange portion by the screw members, and
the second convex portion is provided between portions of the second flange portion that are fixed to the first flange portion by the screw members.

7. The driving device according to claim 5,
wherein the first convex portion and the second convex portion are located inside relative to an outer shape of the housing when viewed from the vertical direction, and are located inside relative to an outer shape of the housing when viewed from a direction orthogonal to both the vertical direction and the axial direction of the motor axis.

8. The driving device according to claim 5,
wherein the housing has a third housing member fixed to another side of the first housing member in the axial direction of the motor axis,
the third housing member has a third convex portion that protrudes in the direction orthogonal to the motor axis,
the first housing member has a fourth convex portion that protrudes in the direction orthogonal to the motor axis, and
the first convex portion, the second convex portion, the third convex portion, and the fourth convex portion have portions each having the same vertical position.

* * * * *